(12) United States Patent
Lazaris

(10) Patent No.: US 7,377,162 B2
(45) Date of Patent: May 27, 2008

(54) METHOD AND APPARATUS FOR LIQUID LEVEL SENSING

(75) Inventor: Nicholas G. Lazaris, Newton, MA (US)

(73) Assignee: Keurig, Incorporated, Wakefield, MA (US)

( * ) Notice: Subject to any disclaimer, the term of this patent is extended or adjusted under 35 U.S.C. 154(b) by 0 days.

(21) Appl. No.: 11/168,885

(22) Filed: Jun. 28, 2005

(65) Prior Publication Data

US 2006/0288777 A1 Dec. 28, 2006

(51) Int. Cl.
*G01F 23/00* (2006.01)
*B67D 5/22* (2006.01)
*A23J 31/00* (2006.01)

(52) U.S. Cl. .............................. 73/313; 222/51; 99/285

(58) Field of Classification Search ................ 73/313, 73/314, 319, 305, 309; 222/51; 340/624, 340/623; 116/228; 702/55; 99/285
See application file for complete search history.

(56) References Cited

U.S. PATENT DOCUMENTS

| | | | | |
|---|---|---|---|---|
| 2,984,108 | A * | 5/1961 | Anderson et al. | 73/323 |
| 3,013,135 | A * | 12/1961 | Russo | 200/84 C |
| 3,381,604 | A | 5/1968 | Bixby | 99/283 |
| 3,596,675 | A * | 8/1971 | Krueger et al. | 137/389 |
| 4,039,772 | A * | 8/1977 | Thorsoe et al. | 392/479 |
| 4,194,397 | A * | 3/1980 | Yasuda | 73/314 |
| 4,748,300 | A * | 5/1988 | Anderson | 200/84 C |
| 5,026,954 | A * | 6/1991 | Cebulski | 200/84 C |
| 5,041,812 | A * | 8/1991 | Misaizu et al. | 340/450.3 |
| 5,083,115 | A * | 1/1992 | Kamiya | 340/624 |
| 5,239,914 | A * | 8/1993 | Salomon et al. | 99/285 |
| 5,346,098 | A | 9/1994 | King et al. | 222/146.5 |
| 5,447,248 | A | 9/1995 | Rodriguez et al. | 215/366 |
| 6,289,728 | B1 * | 9/2001 | Wilkins | 73/149 |
| 6,408,692 | B1 * | 6/2002 | Glahn | 73/313 |
| 2002/0005869 | A1 * | 1/2002 | Locher et al. | 347/7 |
| 2002/0127005 | A1 * | 9/2002 | Roberson | 392/442 |
| 2002/0194674 | A1 * | 12/2002 | McKenna | 4/538 |
| 2003/0066431 | A1 * | 4/2003 | Fanzutti et al. | 99/279 |
| 2005/0103314 | A1 * | 5/2005 | Nather et al. | 123/509 |

FOREIGN PATENT DOCUMENTS

AU 567 825 B2 12/1987
DE 85 33 993 U1 4/1987

(Continued)

OTHER PUBLICATIONS

International Search Report and Written Opinion for International Application No. PCT/US2006/024784, dated Nov. 7, 2006.

*Primary Examiner*—Hezron Williams
*Assistant Examiner*—Tamiko Bellamy
(74) *Attorney, Agent, or Firm*—Wolf, Greenfield & Sacks, P.C.

(57) ABSTRACT

A liquid level sensing arrangement for a tank may include a float having a disc-like shape and a sensor that detects a position of the float relative to the tank. The float may have an overall height/total displacement ratio of 0.5 or less. The float may have a range of motion relative to the tank so that at least a portion of the float may move below a portion of a bottom wall of the tank and/or below an outlet for the tank.

37 Claims, 6 Drawing Sheets

FOREIGN PATENT DOCUMENTS

| | | |
|---|---|---|
| EP | 0 159 149 A1 | 10/1985 |
| EP | 1 514 500 A1 | 3/2005 |
| GB | 2 003 723 A | 3/1979 |
| GB | 2243953 A * | 11/1991 |
| JP | 10253428 A * | 9/1998 |
| WO | WO 01/60221 A1 | 8/2001 |

* cited by examiner

METHOD AND APPARATUS FOR LIQUID LEVEL SENSING

BACKGROUND OF INVENTION

1. Field of Invention

This invention relates to methods and apparatus for tank level sensing.

2. Related Art

Level sensing in a storage tank, such as a tank for storing water in a coffee brewing machine, may be important for several reasons, such as for advising a user that the storage tank needs to be refilled and/or preventing operation of the machine without sufficient water being present in the tank. Level sensing in such applications may be done in different ways. In one approach, the position of a float provided in the tank and having an elongated rectangular shape is detected to determine a water level in the tank. The float is arranged to move as the water level in the tank changes, particularly as the water level approaches the bottom of the tank. The position of the float may be determined by detecting the presence of a magnet carried by the float, e.g., using a magnetically-actuated reed switch.

SUMMARY OF INVENTION

The inventors have appreciated that the use of some prior float arrangements may have certain drawbacks. For example, in some applications an elongated rectangular float may bind in a guideway that guides the float in its movement as the water level changes. If the float binds in such a situation, the float may not accurately indicate a liquid level in the tank. In addition, the inventors have discovered that prior float-type sensing arrangements generally do not provide for nearly complete draining of the liquid in the tank, e.g., because the magnet in the float does not have a range of motion that approaches the tank bottom to a sufficient degree.

In one aspect of the invention, a liquid level sensor arrangement includes a tank defining a volume in which a liquid having a top surface may be held. A chamber including opposed sidewalls may, at least in part, define a chamber in which a non-spherical float is arranged for movement. The float may be positively buoyant in the liquid so as to adjust in position based on changes in location of the top surface of the liquid, and may be arranged to present a single point or single approximately horizontal line of contact with each of the sidewalls of the chamber. With such an arrangement, the float may be less prone to binding in its movement in the chamber, e.g., because the reduced number of contact areas between the float and the chamber sidewalls may help prevent the float from cocking in the chamber and "sticking" in place. Also, an arrangement in accordance with this aspect of the invention may effectively prevent binding because a distance between the single points or lines of contact on opposed sides of the float may be less than a distance between the sidewalls of the chamber.

In one aspect of the invention, a liquid level sensor arrangement for detecting a level of a liquid in a tank includes a tank defining a volume in which a liquid having a top surface may be held. A float may be arranged for movement relative to the tank and to be positively buoyant in the liquid so as to adjust in position based on changes in location of the top surface of the liquid. In one embodiment, the float may have a disc-like outer shape, such as a cylindrical shape, a flat circular shape, a flat oval shape, and/or any other flat or cylinder-like object having a circular-like cross-section, e.g., a 5-or more sided polygonal cross section, an oval cross section, an irregular curve that somewhat approximates a circular shape, etc. The float may have a relatively low overall height to displacement ratio, e.g., of 0.5 or less. A sensor may detect a position of the float, and thereby provide an indication as to a liquid level in the tank, e.g., provide a low liquid level indication, indicate a remaining volume in the tank, indicate a liquid level height in the tank, and so on. The sensor may be able to sense two or more discrete positions of the float so that two or more liquid levels, two or more remaining volumes, etc., may be indicated.

In another aspect of the invention, a liquid level sensor arrangement for detecting a level of a liquid in a tank includes a tank having a bottom wall and defining a volume in which a liquid having a top surface may be held. A float may be arranged for movement relative to the tank and to be positively buoyant in the liquid so as to adjust in position based on changes in location of the top surface of the liquid in the tank. The float may be movable within a range of motion such that at least a portion of the float is movable below at least a portion of the bottom wall of the tank and/or below an outlet of the tank. A sensor may detect a position of the float relative to the tank, e.g., to provide a low liquid level indication.

These and other aspects of the invention will be apparent from the following description and claims.

BRIEF DESCRIPTION OF DRAWINGS

Aspects of the invention are described below with reference to illustrative embodiments, wherein like elements reference like numerals, and wherein.

DETAILED DESCRIPTION

Figure 1:
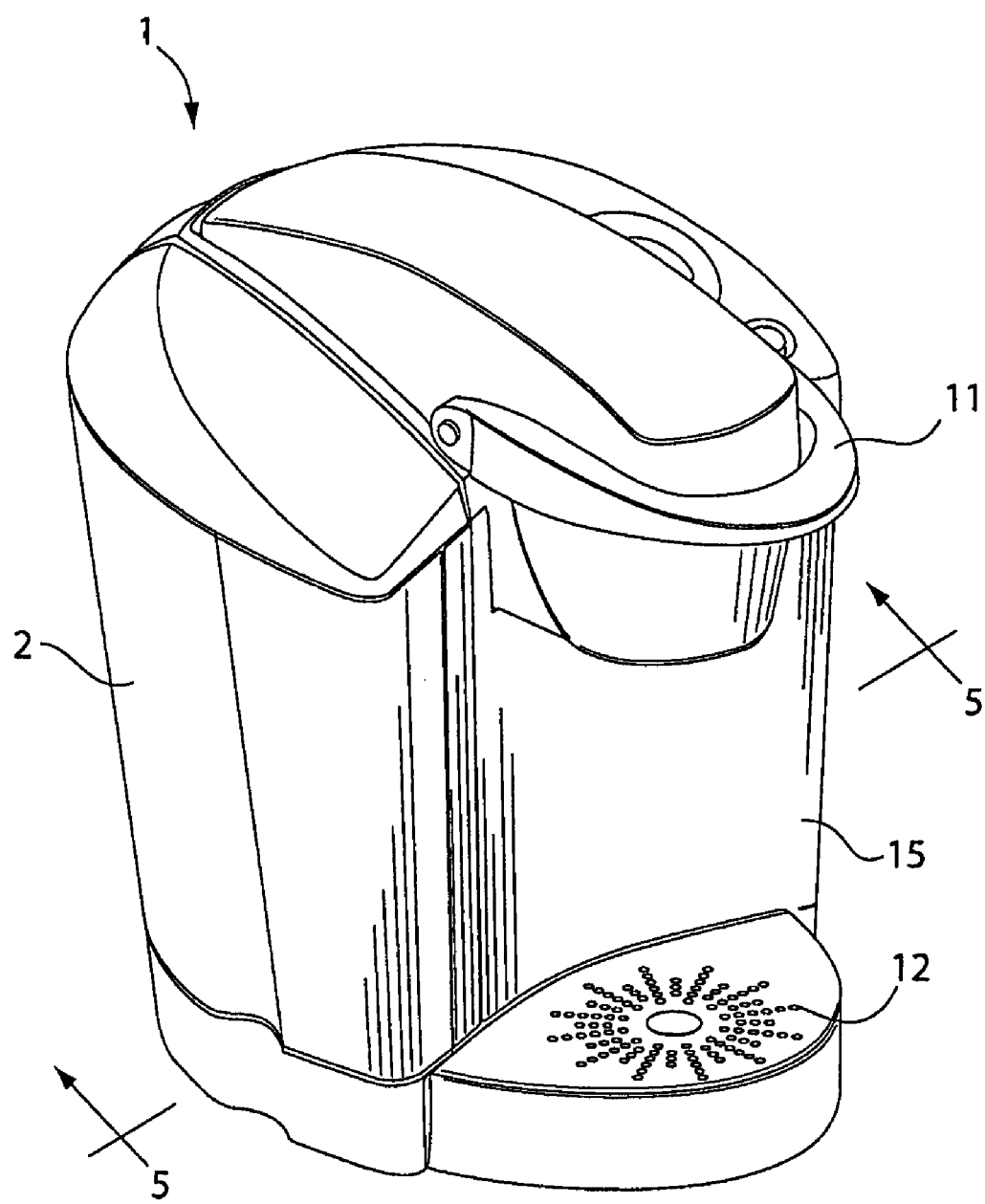
FIG. 1 shows a perspective view of a beverage forming system having a removable tank in accordance with aspects of the invention.

Aspects of the invention may be practiced using any suitable arrangement for the level sensor and/or any associated beverage forming system. Several different embodiments are described herein for purposes of illustration. However, these illustrative embodiments should not be used to narrowly interpret the scope of the invention. For example, embodiments are described below in which portions of a level sensor (e.g., the float and float sensor) are separable from each other, but in some aspects of the invention, the portions of the level sensor may be inseparable, e.g., the tank may not be removable. In addition, various aspects of the invention are described herein, and these various aspects may be used in any suitable combination with each other, or alone.

In one aspect of the invention, a liquid level sensing arrangement may include a float that is arranged for movement relative to a tank adapted to hold a volume of liquid. The float may be positively buoyant in the liquid so that the float adjusts in position relative to the tank based on changes in the level of the top surface of the liquid. For example, the tank may hold a volume of water, and as water is drawn from the tank, the float may move downwardly along with the dropping top surface of the water. A sensor may detect the position of the float, and thereby indicate a liquid level in the tank, e.g., indicate a volume remaining in the tank, indicate a height of the liquid in the tank and/or provide a low liquid level indication.

In one aspect of the invention, the float may have a disk-like outer shape, e.g., similar to a hockey puck shape. As used herein, a "disk-like shape" refers to a cylindrical shape (i.e., a shape having a cylinder portion with a circular cross-section extending between two flat ends), a flat circular shape, a flat oval shape, and/or any other flat or cylinder-like object having a circular-like cross-section, e.g., a 5-or more sided polygonal cross section, an oval cross section, an irregular curve that somewhat approximates a circular shape, and so on. The ends of a cylinder-like shape may be flat, e.g., like the two flat sides of a hockey puck, or the ends may be concave, convex or otherwise suitably shaped.

In one aspect of the invention, the float may be arranged to present a single point or approximately horizontal line of contact between the float and a pair of sidewalls that define a chamber in which the float moves with the liquid level in the tank. For example, a float having a cylindrical shape that is arranged to move in a chamber having six flat side surfaces will present only one point or horizontal line of contact between the float and two of the sidewalls that face the cylindrical portion of the float. This is only one example of how a single point or approximately horizontal line of contact may be provided between the float and two sidewalls of a chamber in which the float may move. For example, a capsule-shaped float, e.g., a float having a rod shape with rounded or spherical ends, may also present a single point or line of contact in a chamber having six flat walls.

Providing a float with a disk-like outer shape or providing an arrangement in which the float presents a single point or approximately horizontal line of contact to each of two walls may allow the float to be less prone to binding or other restriction in its movement when moving with the liquid level in the tank. For example, in some prior float arrangements in which the float has an upright, elongated rectangular shape, the float may tilt, rotate or otherwise move so that the float binds with portions of a guideway that guides the movement of the float. In such an arrangement, the float presents two or more points or horizontal lines of contact on all six sides of the float. In contrast, a disk-like shape may be less prone to such binding, for example, because the float may be capable of rotating around at least one axis when moving with the liquid level and making contact with a guideway. If the guideway has two opposed sidewalls that face the cylinder-like portion of the float, the float may present only one point or line of contact to each sidewall, thereby minimizing a chance of binding that might occur between the two sidewalls. In addition, a disk-like outer shape for the float may provide a more compact shape for the float, thereby minimizing the overall height of the float for a given displacement volume. This feature may also allow for the tank volume to be more fully used since a smaller overall float height may allow the system to detect tank levels that are closer to the bottom wall than arrangements with floats having a larger overall height.

In another aspect of the invention, a liquid level sensing arrangement may include a float that is arranged for movement relative to a tank having a bottom wall. The bottom wall may have any suitable shape, such as flat, horizontal, stepped, curved, etc., and the float may be moveable within a range of motion such that at least a portion of the float is moveable below at least a portion of the bottom wall of the tank. Such an arrangement may allow the float, and an associated sensor that detects a position of the float, to indicate liquid levels in the tank that are near or at a lowermost portion of the bottom wall of the tank. As a result, liquid in the tank may be entirely, or almost entirely drained from the tank when the level sensing arrangement indicates that the liquid level in the tank is low, e.g., the tank needs to be refilled. This.is in contrast to some prior float sensor arrangements in which a relatively large volume and/or liquid depth in the tank is present when a low liquid level indication is provided. This may provide increased convenience to a user since the volume in the tank may be more completely used, thus requiring tank refill on a less frequent basis.

In another aspect of the invention, a float in a level sensing arrangement may be arranged for movement in a chamber defined by a structure that at least partially encloses the chamber. The structure may be provided with one or more vertical ribs or other features that provide one or more relatively small areas of contact for the float as the float moves in the chamber. As a result of the relatively small area(s) of contact, the float may be less likely to bind or otherwise be restricted in its movement in the chamber. In one embodiment, the structure may be at least partially formed integrally with a tank wall, such that the chamber is formed unitarily with the tank. A removable portion of the chamber, such as a removable top wall, may be provided so that the float can be placed in or removed from the chamber.

Figure 2:
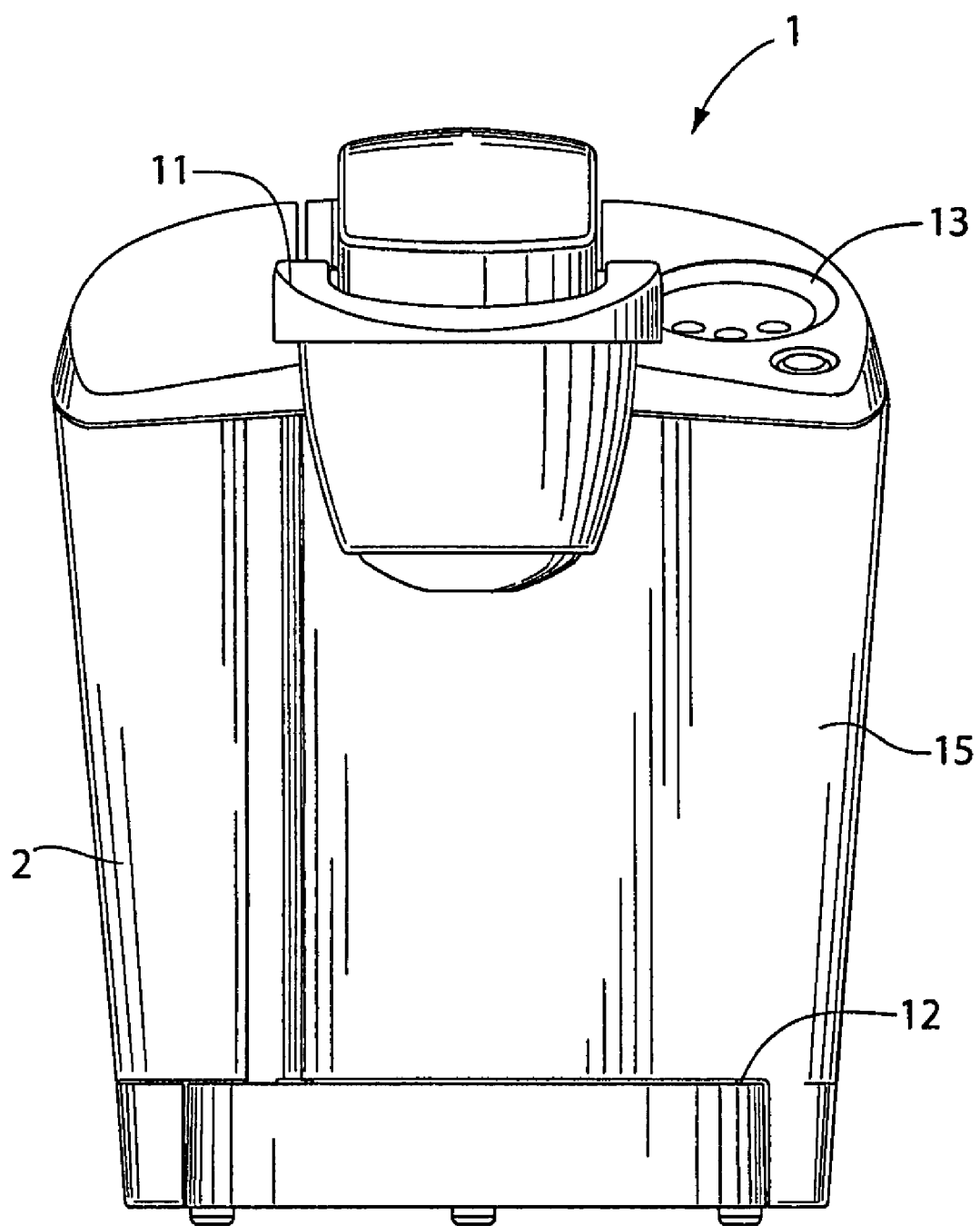
FIG. 2 shows a front view of the FIG. 1 embodiment.

FIGS. 1 and 2 show perspective and front views, respectively, of a beverage forming system 1. In this illustrative embodiment, the beverage forming system 1 is arranged to form brewed beverages, such as coffee, using water provided in a removable tank 2. However, it should be understood that the beverage forming system 1 may be arranged to produce any suitable beverage using any suitable liquid or liquids. In this illustrative embodiment, the beverage forming system 1 is arranged to receive disposable brewing cartridges (not shown) that are placed within a brew chamber exposed by raising a handle 11. After the cartridge is provided to the system 1, a user may cause the system 1 to form a beverage by interacting with a user input and display 13 or by simply closing the brew chamber via the handle 11. Beverage produced by the system 1 may be captured in a cup or other vessel placed on a platform 12.

Figure 3:
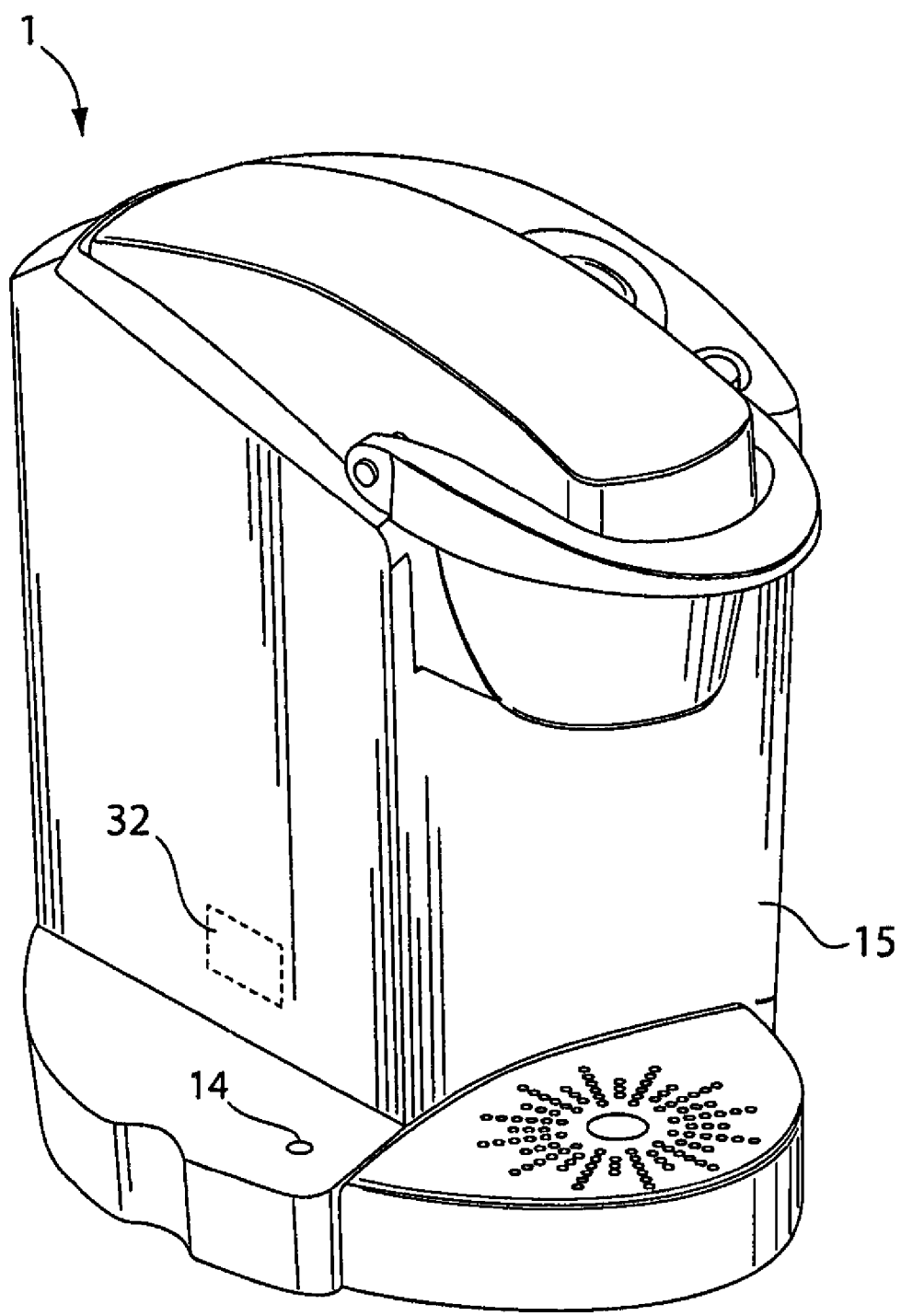
FIG. 3 shows a perspective view of the FIG. 1 system with the water tank removed.
Figure 4:
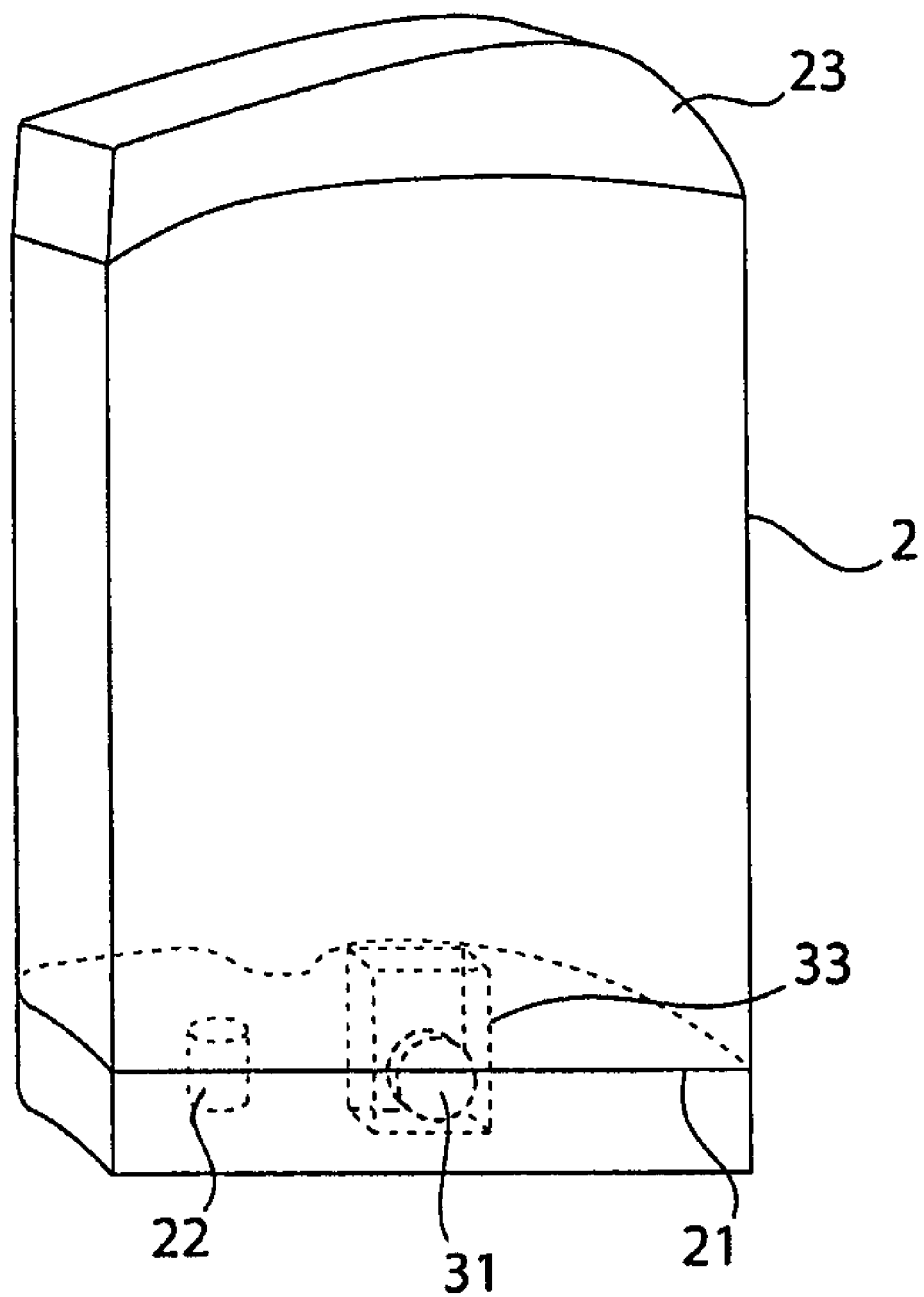
FIG. 4 shows a side view of the water tank in an illustrative embodiment.

FIG. 3 shows a perspective view of the beverage forming system 1 with the tank 2 removed from a portion of a housing 15 that at least partially encloses a beverage forming apparatus, e.g., including a water pump, water heater, system controller, etc. FIG. 4 shows a side view of the tank 2 as viewed from a side of the tank 2 that abuts the housing 15. In this embodiment, a level sensor 3 includes a float 31 associated with the tank 2 and a sensor 32 that is associated with the housing 15. The float 31 is arranged to be moveable relative to the tank 2 in a chamber defined by a structure 33. Thus, when the tank 2 is mounted to the housing 15, the sensor 32 can detect the presence/absence of the float 31 in the chamber. Also, when the tank 2 is mounted to the housing 15, an outlet 22 of the tank 2 mates with an inlet 14 for the beverage forming apparatus so that water or other liquid in the tank 2 (e.g., provided into the tank by removing a cover 23 and dispensing into the tank volume) may be provided via the outlet 22 to the inlet 14.

In one aspect of the invention, the float 31 may have a disc-like shape as shown in FIG. 4, and/or may have a relatively low overall height to total displacement ratio. For example, in one illustrative embodiment, the float may have a cylindrical, puck-like shape with a diameter of approximately 3 cm and a thickness of about 1 cm. In this embodiment, the ratio of the overall height of the float 31 to its total displacement may be less than approximately 0.5. However, in other embodiments, the float may provide an overall height to total displacement ratio of less than 0.5.

In accordance with one aspect of the invention, at least a portion of the float 31 may be movable below a portion of the bottom wall 21 of the tank 2. Also in accordance with an aspect of the invention, at least a portion of the float 31 may be movable below the outlet 22 of the tank 2. As discussed above, providing a range of motion for the float 31 such that at least a portion of the float 31 may move below a portion of the bottom wall 21 and/or the outlet 22 of the tank 2 may allow the level sensor to detect liquid levels at or near the bottom wall of the tank, thereby allowing the system to provide a low liquid indication when little or no liquid remains in the tank.

Figure 5:
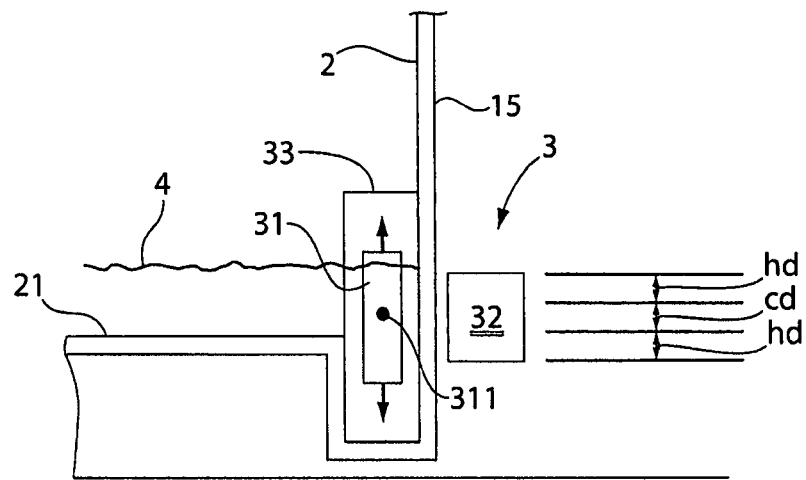
FIG. 5 shows a cross-sectional view of a level sensor having a float in accordance with the invention.

FIG. 5 shows a cross-sectional view in the direction as indicated in FIG. 1 with the tank 2 mounted on the housing 15. As can be seen in this view, the float 31 is free to move in a range of motion defined by the structure 33 that extends below the bottom wall 21 of the tank 2. The float 31 may include a magnetic element 311, such as a permanent magnet, that can be detected by the sensor 32. The magnetic element 311 may be positioned at a geometric center of the float 31, e.g., so that rotation of the float about an axis perpendicular to its flat sides does not cause up/down movement of the magnetic element 311. Alternately, the magnetic element 311 may be positioned at any other suitable location, or not provided at all. In this embodiment, the sensor 32 may include a magnetic reed switch that is opened and closed based on the proximity of the magnetic element 311 to the sensor 32. However, the sensor 32 and/or the float 31 may cooperate in other ways. For example, the float 31 may include a magnetizable material or other material whose presence may be detected by an inductive sensor or other sensor arrangement. In another embodiment, the sensor 32 may detect the presence of the float 31 using a photocell or other optical detector. In short, the sensor 32 may detect the presence and/or position of the float 31 in any suitable way.

In this embodiment, the sensor 32 is arranged so that when the level 4 of the liquid in the tank 2 is relatively high, the float 31 is positioned at an upper end of the chamber defined by the structure 33, e.g., so that the sensor 32 does not detect the presence of the float 31. However, as liquid is drawn from the tank 2 and the level 4 drops, the float 31 may move downwardly in the chamber to a location where the sensor 32 detects the presence of the float 31. For example, the sensor 32 may have a magnetically-operated reed switch that closes when the float 31 is suitably positioned near the sensor 32. The closed state of the reed switch may indicate a low level of liquid in the tank and be used to control various functions of the system 1, such as illuminating a low liquid level indicator lamp, preventing further beverage forming operations, and so on. In one embodiment, the low level indication may be provided when there is a relatively small volume or height of liquid remaining in the tank, e.g., a volume of 4 ounces or less or a height of 25 mm or less. Of course, the level sensor 3 may be arranged to detect multiple discrete positions of the float 31, e.g., to provide an indication of the remaining volume in the tank for multiple float positions.

In this embodiment, the level sensor 3 is arranged so that the sensor 32 detects the presence of the float 31 when the magnetic element 311 is positioned in a central range having a central distance cd relative to the sensor 32, as shown in FIG. 5. Thus, whenever the magnetic element 311 is positioned in the central range, the sensor 32 may be actuated to indicate the presence of the float 31, e.g., a magnetically-actuated reed switch may be closed. However, the presence of the magnetic element 311 in other positions outside of the central range may not cause the sensor 32 to change its indication state.

In one embodiment, the level sensor arrangement may provide for a hysteresis distance for the movement of the float in areas adjacent the central range. For example, the central range may be flanked by top and bottom regions each having a hysteresis distance hd. With the magnetic element 311 in the central region, the sensor 32 may be actuated by the float 31 to provide a low level indication. However, when the magnetic element 311 is positioned in the top or bottom regions, the output of the sensor 32 may depend upon the sensor state before the element 311 moved into the top or bottom region. For example, if the element 311 moves into the top region from an uppermost position in the chamber (while the sensor 32 is not actuated to provide a low level indication), the state of the sensor 32 will remain unchanged unless the element 311 moves into the central region. If, however, the element 311 moves into the top or bottom regions from the central region (while the sensor 32 is actuated to provide a low level indication), the sensor 32 will remain actuated while the element 311 remains in the top or bottom region.

For purposes of illustration, consider a situation where the float 31 starts out at a position at the top of the chamber of the structure 33 and the sensor 32 does not detect the float 31. As the liquid level drops, the float 31 moves into the top region, yet the sensor 32 will not change its state until the float 31 (e.g., the magnetic element 311) is present in the central region. At that time, the sensor 32 will change state (e.g., to provide a low level indication), and will remain in that state as the float 31 moves downwardly into the bottom region. If the hysteresis distance hd of the bottom region extends to the lowermost position of the float 31, the sensor 32 will remain in the "low level indication" or other state.

In one embodiment, the hysteresis distance may be 3-5 mm. That is, the top and bottom regions on either side of the central region may have a length of approximate 3-5 mm. The length of the central region may be about 8 mm. Providing the top and bottom regions with a hysteresis distance may provide for more stable output for the level sensor 3. For example, minor sloshing or other movement of the liquid in the tank 2 may cause the float 31 to move slightly in the chamber. By providing a hysteresis distance for the float, the level sensor 3 may be prevented from "toggling" or otherwise outputting alternating low level indications and acceptable level indications over a short time span.

Figure 6:
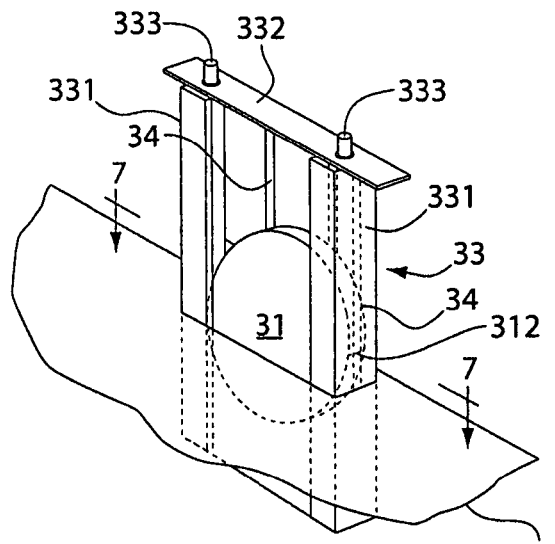
FIG. 6 shows a perspective view of the float and associated guide structure.
Figure 7:
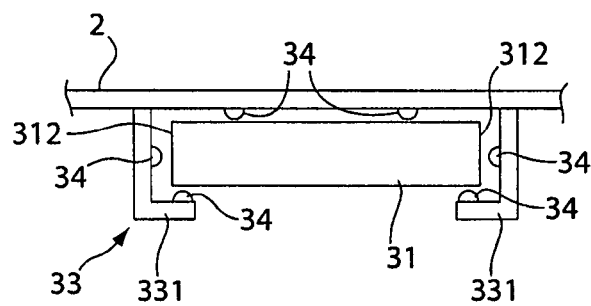
FIG. 7 shows a cross-sectional view of the float and guide structure.

FIGS. 6 and 7 show a perspective view and cross-sectional view, respectively, of a structure 33 that defines a chamber in which the float 31 may move. In this illustrative embodiment, the structure 33 includes a pair of rails 331 with an "L"-shaped cross-section that extend inwardly from a wall of the tank 2. These rails 331 extend vertically and serve to capture the float 31 so that the float 31 is free to move vertically in the chamber, but otherwise is not free to leave the chamber. A removable top portion 332 is provided at an upper end of the chamber. In this embodiment, the top portion 332 is removably engaged at pins 333 that extend upwardly from the rails 331. The pins 333 may have a friction fit with the top portion 332 so that the float 31 remains captured within the chamber under normal operating conditions, but allow the top portion 332 to be removed if desired. Alternately, the pins 333 may be bent, deformed, or otherwise arranged so that the top portion 332 is not removable after the float 31 is placed in the chamber. The lower portion of the chamber that extends below the bottom wall 21 of the tank 2 may be defined by a rectangular well or pocket that is formed as part of the tank 2. The chamber may also include one or more vertical ribs 34 or other features that contact the float 31 and help minimize the likelihood that the float 31 will bind or otherwise be restricted in its movement in the chamber. It should be understood that other features may be provided in this regard, such as one or more tabs, bumps, grooves or other features. All or portions of the structure 33 may be formed integrally with the tank, such as molded with the tank walls and/or bottom wall 21. Alternatively, the structure 33 may be made separately from the tank 2 and secured in the tank by glue, adhesive, fasteners or other suitable arrangement.

As discussed above, one aspect of the invention provides a float that presents a single point or a single approximately horizontal line of contact between the float and a pair of opposed sidewalls that define a chamber in which the float may move. The illustrative embodiment shown in FIGS. 6 and 7 includes an arrangement in which the float 31 presents a single approximately horizontal line of contact (see, e.g., the horizontal line of contact 312 shown in FIGS. 6 and 7) on opposed sides of the cylindrical portion that face the opposed sidewalls formed by the rails 331. Provision of the ribs 34 on the sidewalls may further enhance this feature, since the float 31 may only contact a relatively small area of each rib 34, instead of a broader area of each sidewall. The point or line of contact on opposed sides of the float 31 may be located at a same elevation on the float 31, or may be provided at different heights on the float.

Figure 8:
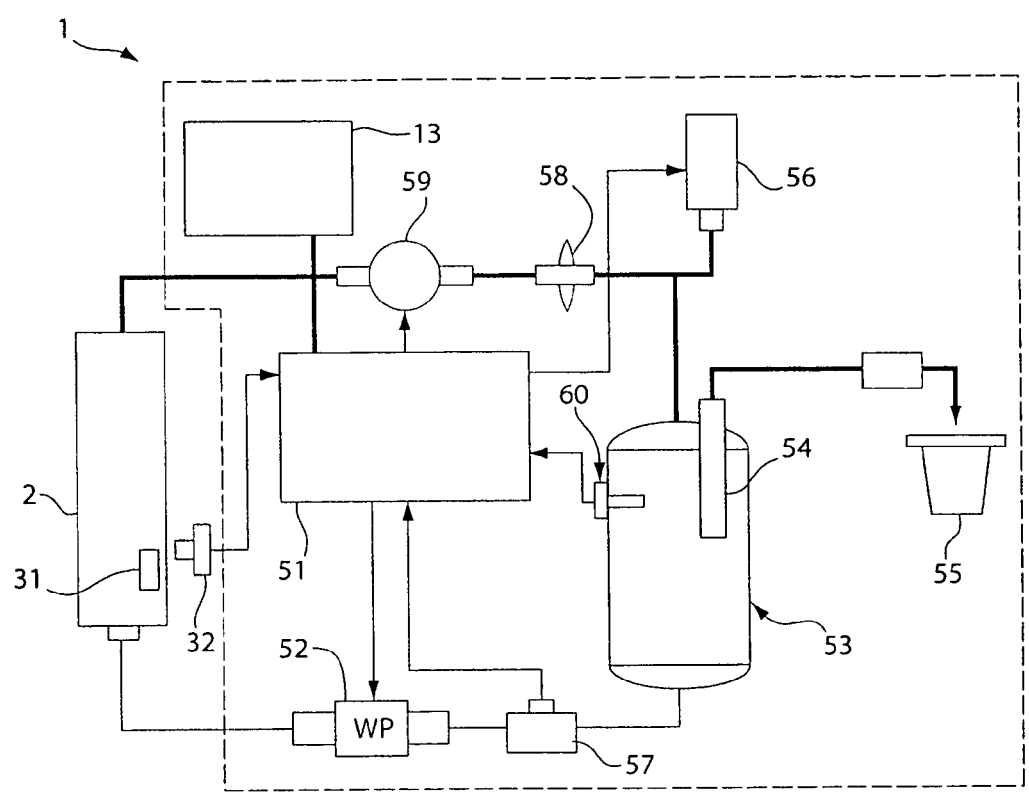
FIG. 8 is a schematic diagram of a beverage forming system in accordance with an aspect of the invention.

FIG. 8 shows a schematic block diagram of various components included in a beverage forming system 1 in an aspect of the invention. Water or other liquid from the tank 2 may be provided by a water pump 52 to a chamber 53. Operation of the water pump 52 and other components of the system 1 may be controlled by a controller 51, e.g., including a programmed processor and/or other data processing device. The chamber 53 may be filled with a desired amount of liquid by any suitable technique, such as running the water pump 52 for a predetermined time, sensing a water level in the chamber 53, detecting a pressure rise in chamber 53, or other. Water in the tank may be heated, if desired, by way of a heating element (not shown) whose operation is controlled using input from a temperature sensor 60, and the water may be dispensed from the tank via a tube 54 to a cartridge 55. The cartridge 55 may include any beverage making ingredient, such as ground coffee, a flavored drink mix, or other substance. Liquid may be discharged from the chamber 53 by pressurizing the chamber with air provided by an air pump 56 that causes the liquid to be discharged out of the tube 54. Completion of the dispensing from the chamber 53 may be detected in a variety of ways, such as by detecting a pressure drop with a pressure sensor 57, by detecting a water level change in the chamber 53, or other. When filling the chamber 53 with water from the tank 2, the chamber 53 may be vented by opening a line including a filter 58 and a valve 59. The filter 58 may prevent undesired items, such as minerals, scale deposits or other, from interfering with the operation of the valve 59. A user may input commands or other information to the controller 51, and/or the controller 51 may provide information to the user via a user input/display 13. The user input/display 13 may include an LCD or other suitable display, and/or one or more operation buttons, knobs or other devices that the user may use to control the system operation. As was discussed above, the sensor 32 may also communicate with the controller 51 and provide a low liquid indication to the controller 51 when the float 31 is detected to be at or below a specified level in the tank 2. As discussed above, the sensor 32 may be capable of providing other information, such as a remaining volume of liquid in the tank, a liquid height in the tank, or other.

While the invention has been described in conjunction with specific embodiments thereof, it is evident that many alternatives, modifications, and variations will be apparent to those skilled in the art. Accordingly, embodiments of the invention as set forth herein are intended to be illustrative, not limiting. Various changes may be made without departing from the spirit and scope of the invention.

What is claimed is:

1. A liquid level sensor arrangement for detecting a level of a liquid in a tank, comprising:
 a tank defining a volume in which a liquid having a top surface is holdable;
 a structure that defines a chamber including opposed sidewalls that, at least in part, define the chamber;
 a non-spherical float that is arranged for movement in the chamber relative to the tank and to be positively buoyant in the liquid so as to adjust in position based on changes in location of the top surface of the liquid, the float being arranged to present only a single point or single approximately horizontal line of contact with each of the sidewalls; and
 a sensor that detects a position of the float;
 wherein the structure includes at least one vertical rib adapted to contact the float in the chamber.

2. The arrangement of claim 1, wherein the structure defines a box-shaped area in which the float is movable.

3. The arrangement of claim 1, wherein the tank includes a bottom wall and the chamber extends below the bottom wall.

4. The arrangement of claim 1, wherein the tank includes an outlet, and the chamber extends below the outlet.

5. The arrangement of claim 1, further comprising a beverage forming apparatus adapted to form a beverage from liquid in the tank, and wherein the tank is separable from the beverage forming apparatus.

6. The arrangement of claim 1, wherein the float includes a magnetic element.

7. The arrangement of claim 1, wherein the float includes a magnet located at a geometric center of the float.

8. The arrangement of claim 1, wherein the sensor includes a reed switch actuated by a magnetic element associated with the float.

9. The arrangement of claim 1, further comprising a body that supports the sensor, and wherein the float is supported by the tank and the tank and float are separable from the body.

10. The arrangement of claim 1, wherein the float and sensor are arranged to provide a hysteresis distance for movement of the float in regions adjacent a central region.

11. The arrangement of claim 1, wherein the tank includes a bottom wall, and further comprising a structure attached to a wall of the tank that defines a chamber for movement of the float, the chamber extending above and below the bottom wall.

12. The arrangement of claim 1, wherein the float has a disc-like shape.

13. A liquid level sensor arrangement for detecting a level of a liquid in a tank, comprising:
   a tank having a bottom wall and defining a volume in which a liquid having a top surface is held, and having an outlet for the liquid;
   a float that is arranged for movement relative to the tank and to be positively buoyant in the liquid so as to adjust in position based on changes in location of the top surface of the liquid in the tank, the float being movable within a range of motion such that at least a portion of the float is movable below at least a portion of the bottom wall of the tank, wherein the float includes a magnetic element and the float is positioned apart from the outlet; and
   a sensor that detects a position of the float relative to the tank.

14. The arrangement of claim 13, further comprising: a structure that defines a chamber in which the float is movable relative to the tank.

15. The arrangement of claim 14, wherein the structure defines a box-shaped area in which the float is movable.

16. The arrangement of claim 14, wherein the bottom wall is substantially flat and the chamber extends below the bottom wall.

17. The arrangement of claim 14, wherein the chamber extends below the outlet.

18. The arrangement of claim 14, wherein the structure includes at least one vertical rib adapted to contact the float in the chamber.

19. The arrangement of claim 13, further comprising a housing that at least partially encloses a beverage forming apparatus adapted to form a beverage from liquid in the tank, and wherein the tank is separable from the housing.

20. The arrangement of claim 13, wherein the float includes a magnet located at a geometric center of the float.

21. The arrangement of claim 13, wherein the sensor includes a reed switch actuated by magnetic element associated with the float.

22. The arrangement of claim 13, further comprising a body that supports the sensor, and wherein the float is supported by the tank and the tank and float are separable from the body.

23. The arrangement of claim 13, wherein the float and sensor are arranged to provide a hysteresis distance for movement of the float in regions adjacent a central region.

24. The arrangement of claim 13, further comprising a structure attached to a wall of the tank that defines a chamber for movement of the float, the chamber extending above and below the bottom wall.

25. The arrangement of claim 24, wherein the structure includes a top portion removably mounted to the structure to allow the float to be placed in or removed from the chamber.

26. The arrangement of claim 13, wherein the float has a disc-like outer shape.

27. The arrangement of claim 13, wherein the sensor is arranged to provide a low liquid level indication when the liquid depth in the tank is 25 mm or less.

28. The arrangement of claim 13, wherein the sensor is arranged to provide a low liquid level indication when the tank contains 4oz. or less of liquid.

29. A liquid level sensor arrangement for detecting a level of a liquid in a tank, comprising:
   a tank defining a volume in which a liquid having a top surface is holdable;
   a float that is arranged for movement relative to the tank and to be positively buoyant in the liquid so as to adjust in position based on changes in location of the top surface of the liquid, the float having a disc-like outer shape;
   a structure that defines a chamber in which the float is movable relative to the tank, the structure including opposed sidewalls, wherein the float being arranged to present only a single point or single approximately horizontal line of contact with each of the sidewalls of the structure; and
   a sensor that detects a position of the float;
   wherein the structure includes at least one vertical rib adapted to contact the float in the chamber.

30. The arrangement of claim 29, wherein the structure defines a box-shaped area in which the float is movable.

31. The arrangement of claim 29, wherein the tank includes a bottom wall and the chamber extends below the bottom wall.

32. The arrangement of claim 29, wherein the tank includes an outlet, and the chamber extends below the outlet.

33. The arrangement of claim 29, further comprising a beverage forming apparatus adapted to form a beverage from liquid in the tank, and wherein the tank is separable from the beverage forming apparatus.

34. The arrangement of claim 29, wherein the float includes a magnetic element.

35. The arrangement of claim 29, wherein the float includes a magnet located at a geometric center of the float.

36. The arrangement of claim 29, wherein the sensor includes a reed switch actuated by a magnetic element associated with the float.

37. The arrangement of claim 29, wherein the float and sensor are arranged to provide a hysteresis distance for movement of the float in regions adjacent a central region.

* * * * *